US005163211A

United States Patent [19]

Rubino et al.

[11] Patent Number: 5,163,211

[45] Date of Patent: Nov. 17, 1992

[54] PULLING TOOL

[75] Inventors: Michael Rubino, P.O. Box 31695, Chicago, Ill. 60631; Michael J. Berg, Elgin, Ill.

[73] Assignee: Michael Rubino, Chicago, Ill.

[21] Appl. No.: 737,046

[22] Filed: Jul. 29, 1991

[51] Int. Cl.[5] .............................................. B23P 19/04

[52] U.S. Cl. ........................................ 29/259; 29/261; 29/426.4; 29/764; 29/598

[58] Field of Search ................. 29/764, 758, 762, 258, 29/259, 260, 261, 262, 267, 426.4, 596, 598

[56] References Cited

U.S. PATENT DOCUMENTS

| | | | |
|---|---|---|---|
| 2,170,461 | 8/1934 | Pepperdine | 29/261 X |
| 2,188,074 | 1/1940 | Condon | 29/261 |
| 3,735,471 | 5/1973 | Kuppler | 29/261 |
| 4,077,103 | 3/1978 | Kelley | 29/259 |

*Primary Examiner*—Carl E. Hall

*Attorney, Agent, or Firm*—Milton S. Gerstein

[57] ABSTRACT

An improved tool for pulling off a rotor of a motor from a shaft or a fan from a shaft, which improved tool is provided with hooked arms that are releasably but securely held at one end in the housing, without the use of retaining clips, so that the arms do not fall off during use or become lost, and so that they do not interfere with the use of the tool when using the securing bolts for pulling off a rotor. The hooked arms of the invention are also hexagonal shaped, and securing bolts are provided with hexagonal-shaped recesses in their heads, so that the hooked arms may themselves be used for rotating the securing bolts when pulling off a rotor of a motor from a shaft. To ensure that the each hooked arm is releasably retained in a respective hole of the housing, the end of the arm is provided with a hook defined by a straight piece extending at an acute angle with respect with the main, elongated body of the arm.

19 Claims, 1 Drawing Sheet

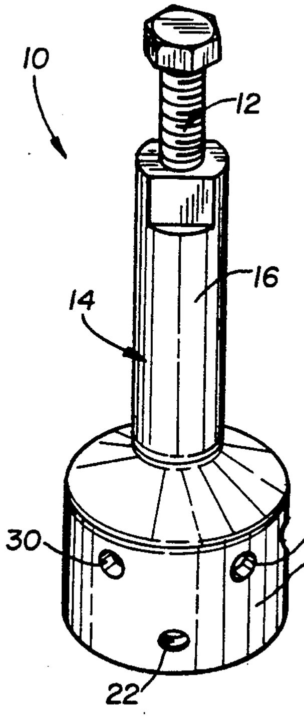
FIG. 1
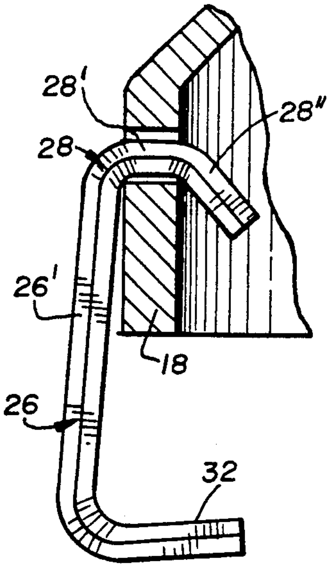
FIG. 2
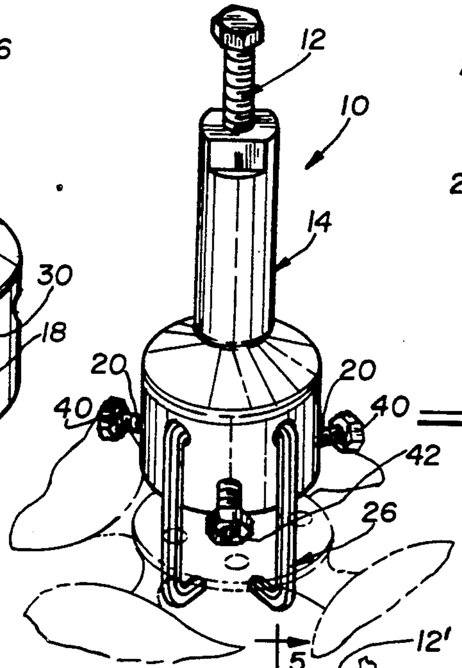
FIG. 3
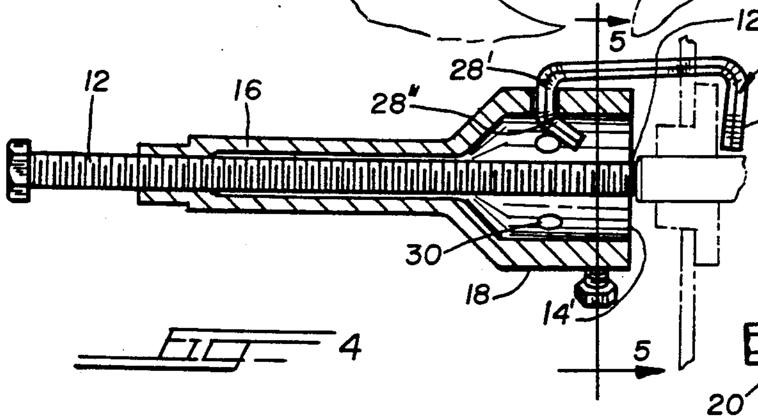
FIG. 4
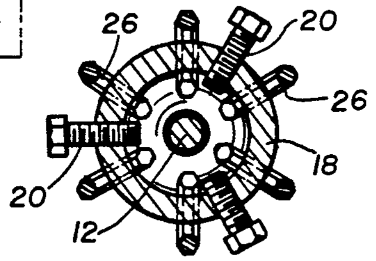
FIG. 5
FIG. 6
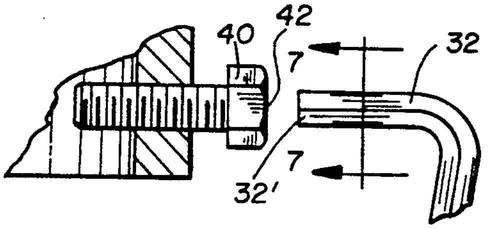
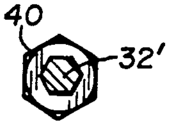
FIG. 7

PULLING TOOL

BACKGROUND OF THE INVENTION

The present invention is directed to a tool for pulling off a rotor of a motor or a fan from a shaft. In U.S. Pat. No. 4,077,103 Kelley, which is incorporated by reference herein, there is disclosed such a tool for pulling off a rotor of a motor or a fan from a shaft. The tool includes an elongated, rotatable screw that is partially threaded in a hollow housing. The end of the elongated screw can be made to protrude from the end of the housing by rotating the screw in a first direction. By causing the end of the screw to protrude from the housing, the end may be brought into abutting engagement with the end of a shaft on which is mounted a rotor of a squirrel-cage motor, for example, or a fan. The housing is provided with means for securing the housing to either the rotor of a motor or to a fan, whereby, after abutting the end of the elongated screw against the end of the shaft, the screw is rotated causing the housing, with the securing means, to be translated along the screw, in a direction away from the shaft, which housing thereby carries along with it the rotor of the motor or the fan on the shaft to which the securing means had been applied. The securing means takes the form of a plurality of rotatable gripping bolts that are used for gripping the outer surface of a rotor of a motor, or the like, while, for removing a fan, or the like, from a shaft, a plurality of hooked arms are provided with an end of each hooked arm being removably received in a hole of the housing, with the other end "hooking" a rear surface-portion of the fan, whereby the respective rotor or fan, or the like, may be pulled off the shaft according to the method above-described. However, the hooked arms of this patent suffer from the serious disadvantage of falling out from their insertion-hole in the housing. Thus, the tool of the patent is also provided with retaining clips for holding the hooked arms in place, so they do not fall out and become lost, and so they do not interfere with the use of the securing bolts when pulling off a rotor of a motor, or the like, from a shaft. However, these retaining clips have not been found to be practicable in use, and have been ineffective in preventing the hooked arms from falling out and from interfering with the securing bolts for a rotor of a motor. In addition, the shape of the housing in the tool of the patent is square-shaped with the holes formed in the housing for receiving the ends of the hooked arms being provided in two, adjacent pairs, where one pair of holes is formed in one lateral surface face of the housing, and the other pair of holes in the opposite surface face of the housing. This arrangement fixes the manner in which the hooked arms are arranged with respect to the housing, which is a severe detriment to the use of the tool, since not all fans are provided with the same number of vanes nor with vanes of the same angular extent. Thus, where the hooked arms may be perfectly suited for a fan with four blades, the tool can only be used with difficulty for fans having more or less than four vanes, or a fan having vanes of considerably different angular extent.

SUMMARY OF THE INVENTION

The present invention is directed to an improved tool for pulling off a rotor of a motor from a shaft or a fan from a shaft, which improved tool is provided with hooked arms that are releasably but securely held at one end in the housing, without the use of retaining clips, so that the arms do not fall off during use or become lost, and so that they do not interfere with the use of the tool when using the securing bolts for pulling off a rotor. The hooked arms of the invention are also hexagonal-shaped, and the securing bolts are provided with hexagonal-shaped recesses in their heads, so that the hooked arms may themselves be used for rotating the securing bolts when pulling off a rotor of a motor from a shaft. In addition, the housing of the improved tool of the invention is circular in shape, and is provided with a plurality of equally-spaced holes about its .circumference, which holes received the hooked ends of the hooked arms, so that various configurations of hooked arms may be provided to best suit the configuration of vanes and type of fan being pulled off from a shaft. To ensure that the each hooked arm is releasably retained in a respective hole of the housing, the end of the arm is provided with a hook defined by a straight piece extending at an acute angle with respect with the main, elongated body of the arm.

BRIEF DESCRIPTION OF THE DRAWINGS

The invention will be more readily understood with reference to the accompanying drawing, wherein:

FIG. 1 is an isometric view of the pulling tool of the invention;

FIG. 2 is an isometric view thereof showing the tool in use for pulling off a fan from a shaft;

FIG. 3 is a detail view, in partial cross section, showing the shape of the upper end of each hooked securing arm for releasable but securely mounting it in a hole of the housing of the tool of the invention;

FIG. 4 is a longitudinal cross-sectional view of the tool showing the hooked securing arms in use;

FIG. 5 is a cross-sectional view taken along line 5—5 of FIG. 4;

FIG. 6 is a plan view showing the supplemental use of each hooked securing arm for rotating the securing bolts; and FIG. 7 is a cross-sectional view taken along line 7—7 of FIG. 6.

DETAILED DESCRIPTION OF THE INVENTION

Referring now to the drawings in greater detail, the tool of the invention is indicated generally by reference numeral 10. The tool includes an elongated, rotatable screw 12 that is rotatably mounted in a hollow housing 14. The length of the screw 12 is greater than the length of the housing, so that the end 12' of the screw may be made to protrude out of the enlarged open end 14' of the housing. The housing 14 is itself divided into a narrow-diameter portion 16, and an larger-diameter portion 18. The narrow-diameter portion prevents the screw 12 from wobbling during use. The larger-diameter portion 18 mounts securing means which contact the element, such as a rotor of a motor or a fan, for pulling it off a shaft. The securing means has a first set of bolts 20 that are rotatable in holes 22 formed in the housing which grip, at their interior ends, the outer, circumferential surface of a rotor to be pulled off from a shaft. The securing means also has a series of hooked, securing arms 26 that are used for gripping a fan for pulling the fan off from a shaft. Each securing arm has a main, elongated portion 26', a first end 28 for passage through one of a plurality of holes 30 formed in the housing, and a second end 32 that "hooks" the fan from behind, in the manner depicted in FIGS. 2 and 4. The above-described parts are conventional, as shown in U.S. Pat. No. 4,077,103—Kelley.

The tool 10, however, is a considerable improvement over the prior art, as described hereinbelow. Whereas the prior art housing was rectilinear in cross section, the larger-diameter housing portion 18 is circular in cross section, with the holes 30 equally spaced thereabout. The number of holes is preferably six in number. This arrangement of the holes 30 allows for the securing arms 26 to be equally-spaced apart which better matches the vanes of a fan to be pulled off, and also allows for different arrangements. For example, when a fan with only three vanes is to be pulled off, only three securing arms 26 need be used, which three are inserted into every other hole 30 to better match the configuration of the fan to be removed. The arrangement of holes 30 allow for other arrangements of the securing arms 26 that suit the particular fan, or similar device, to be pulled off, providing a much more adaptable and flexible tool to suit various types of jobs and environments.

Each securing arm has a first, hooked end 28 made up of a first, substantially-horizontal section 28′, and a second, angular section 28″. The angular section 28″ forms an acute angle with respect to the vertical, center line of the main elongated portion 26′ of the securing arm. In the preferred embodiment, this acute angle is between 30 and 60 degrees with respect to the vertical, when viewing FIG. 3. This acute-angle section 28″ with horizontal section 28′ allows for insertion of the first end of the securing arm through a hole 30 in a relatively easy manner, and yet prevents the accidental removal of the first end from the housing 14. The straight, horizontal section 28′ acts as a fulcrum, and ensures that the main elongated portion 26′ of the securing arm is allowed to hang downwardly as close to vertical as possible, and provide enough leeway, so that the second end of the securing arm may be "hooked" about the back of a fan, or the like to be pulled off from a shaft, such leeway also resulting from the acute-angle section 28″ and its contact against the interior wall surface adjacent the respective hole 30, which provides a fulcrum for rotation a direction perpendicular to the rotation allowed by the horizontal section 28′, whereby the securing arm may be rotated to a limited enough degree for entraining the second hooked end of the securing arm in back of the fan for gripping it, if necessary. Each hole 30 has a diameter larger than the diameter of the securing arm, so as to also provide the necessary leeway to the first end 28′ of the securing arm to ensure the limited pivoting of the first end 28′ about the fulcrum provided by the acute-angle section 28″.

Each securing arm 26 of the invention has an hexagonal cross-sectional shape, as seen in FIG. 7. The reason for this is to allow the use of each securing arm for rotating the securing bolts 20. Each bolt has a hex-head portion 40 that may be gripped by a conventional wrench for rotating the bolt, and also has, according to the invention, a hexagonal-shaped recess 42 which receives the hexagonally-shaped end 32′ of the second end 32 of a securing arm, whereby the securing arm may be used as a driver for rotating the bolt. Since, when the bolts 20 are used for pulling off a rotor of a motor, the securing arms 26 are not needed, the present invention allows for a dual-function for the securing arms. The other arms 26 not being used to rotate the bolts 20 are prevented from falling out during their nonuse period by the acute-angle section 28″ above-described, and also are prevented from interfering with the bolts 20, since they cannot accidentally fall out, and since they only have a very limited capability of angular pivoting in a direction where the second end 32 moves toward the housing portion 18.

While a specific embodiment of the invention has been shown and described, it is to be understood that numerous changes and modifications may be made therein without departing from the scope, spirit and intent of the invention as set forth in the appended claims.

What is claimed is:

1. In a pulling tool for pulling off a rotor of a motor or a fan from a shaft, said pulling tool comprising an elongated screw having a first end and a second end, a housing with which said screw is threadingly received, said housing comprising a first open end through which threadingly passes said screw, and a second open end through which protrudes said second end of said screw, said housing comprising a first securing means for releasably holding a rotor of a motor, and second securing means for releasably holding a fan, said first securing means comprising a plurality of rotatable bolts and a first plurality of holes formed in said housing for threadingly receiving said plurality of bolts, and said second securing means comprises a plurality of hooked securing arm-members, each said arm-member having a first end and a second hooked end, and a second plurality of holes for removably receiving the first ends of said arm-members, said second end of each said arm-member being capable of being hung so as to protrude beyond said second open end of said housing, wherein the improvement comprises:

wherein at least one said arm-member has a hexagonal cross section; each said bolt of said first securing means having a head portion, and a hexagonally-shaped recess in said head portion for receiving a hexagonally-shaped end of said at least one arm-member, whereby said bolts may be rotated using said arm-member.

2. The tool according to claim 1, wherein each said arm-member has a hexagonal cross section.

3. The tool according to claim 1, wherein each said arm-member comprises a main elongated portion, said first end of each said arm-member having a first substantially horizontal portion extending from said main elongated portion, and a second acute-angle portion extending at an acute angle with respect to said main elongated portion, whereby each said arm is removably held in a respective said hole of said second plurality of holes to substantially prevent accidental removal of said first end therefrom.

4. The tool according to claim 3, wherein said acute-angle portion has a central longitudinal axis, and said main elongated portion has a central longitudinal axis, said angle between said central longitudinal axes forming said acute angle, said acute being between 30 and 60 degrees.

5. The tool according to claim 1, wherein said housing comprises at least a first section having a circular cross section; said first and second plurality of holes being formed in said first circular cross-section section; said second plurality of holes being equally spaced about said first section.

6. The tool according to claim 5, wherein said second plurality of holes comprises six holes spaced equidistantly apart about the circumference of said first, circular cross-section section; said second securing means comprising at least three arm-members with the first ends of said three arm-members being removably mounted in three said holes of said second plurality of holes, said three holes being alternate ones of said holes of said second plurality of holes.

7. The tool according to claim 6, wherein said second securing means comprises at least three arm-members with the first ends of said three arm-members being removably mounted in three said holes of said second plurality of holes, said three holes being alternate ones of said holes of said second plurality of holes.

8. In a pulling tool for pulling off a rotor of a motor or a fan from a shaft, said pulling tool comprising an elongated screw having a first end and a second end, a housing with which said screw is threadingly received, said housing comprising a first open end through which threadingly passes said screw, and a second open end through which protrudes said second end of said screw, said housing comprising a first securing means for releasably holding a rotor of a motor, and second securing means for releasably holding a fan, said first securing means comprising a plurality of rotatable bolts and a first plurality of holes formed in said housing for threadingly receiving said plurality of bolts, and said second securing means comprises a plurality of hooked securing arm-members, each said arm-member having a first end and a second hooked end, sand a second plurality of holes for removably receiving the first ends of said arm-members, said second end of each said arm-member being capable of being hung so as to protrude beyond said second open end of said housing, wherein the improvement comprises:

each said arm-member comprising a main elongated portion, said first end having a first substantially horizontal portion extending from said main elongated portion, and a second acute-angle portion extending at an acute angle with respect to said main elongated portion, whereby each said arm is removably held in a respective said hole of said second plurality of holes to substantially prevent accidental removal of said first end therefrom;

said acute-angle portion having a central longitudinal axis, and said main elongated portion having a central longitudinal axis, said angle between said central longitudinal axes forming said acute angle.

9. The tool according to claim 8, wherein said housing comprises at least a first section having a circular cross section; said first and second plurality of holes being formed in said first circular cross-section section; said second plurality of holes being equally spaced about said first section.

10. The tool according to claim 9, wherein said second plurality of holes comprises six holes spaced equidistantly apart about the circumference of said first, circular cross-section section.

11. The tool according to claim 10, wherein said second securing means comprises at least three arm-members with the first ends of said three arm-members being removably mounted in three said holes of said second plurality of holes, said three holes being alternate ones of said holes of said second plurality of holes.

12. In a pulling tool for pulling off a rotor of a motor or a fan from a shaft, said pulling tool comprising an elongated screw having a first end and a second end, a housing with which said screw is threadingly received, said housing comprising a first open end through which threadingly passes said screw, and a second open end through which protrudes said second end of said screw, said housing comprising a first securing means for releasably holding a rotor of a motor, and second securing means for releasably holding a fan, said first securing means comprising a plurality of rotatable bolts and a first plurality of holes formed in said housing for threadingly receiving said plurality of bolts, and said second securing means comprises a plurality of hooked securing arm-members, each said arm-member having a first end and a second hooked end, and a second plurality of holes for removably receiving the first ends of said arm-members, said second end of each said arm-member being capable of being hung so as to protrude beyond said second open end of said housing, wherein the improvement comprises:

said housing comprising at least a first section having a circular cross section; said second plurality of holes being formed in said circular cross-section section; said second plurality of holes being equally spaced about said section: and wherein at least one said arm-member has a hexagonal cross section; each said bolt of said first securing means having a head portion, and a hexagonally-shaped recess in said head portion for receiving a hexagonally-shaped end of said at least one arm-member, whereby said bolts may be rotated using said arm member.

13. The tool according to claim 12, wherein said second plurality of holes comprises six holes spaced equidistantly apart about the circumference of said circular cross-section section.

14. The tool according to claim 13, wherein said second securing means comprises at least three arm-members with the first ends of said three arm-members being removably mounted in three said holes of said second plurality of holes, said three holes being alternate ones of said holes of said second plurality of holes.

15. The tool according to claim 12, wherein said second securing means comprises four arm-members with the first ends of said four arm-members being removably mounted in four said holes of said second plurality of holes, said four holes being chosen ones of said holes of said second plurality of holes for best matching the type of fan to be removed.

16. The tool according to claim 9, wherein each said arm-member has a hexagonal cross section.

17. The tool according to claim 12, wherein each said arm-member comprises a main elongated portion, said first end having a first substantially horizontal portion extending from said main elongated portion and a second acute-angle portion extending at an acute angle with respect to said main elongated portion, whereby each said arm is removably held in a respective said hole of said second plurality of holes to substantially prevent accidental removal of said first end therefrom.

18. The tool according to claim 17, wherein said acute-angle portion has a central longitudinal axis, and said main elongated portion has a central longitudinal axis, said angle between said central longitudinal axes forming said acute angle.

19. The tool according to claim 14, wherein at least one said arm-member has a hexagonal cross section; each said bolt of said first securing means having a head portion, and a hexagonally-shaped recess in said head portion for receiving a hexagonally-shaped end of said at least one arm-member, whereby said bolts may be rotated using said arm member.

* * * * *